April 8, 1958
E. CLAVEAU
2,829,915
MOTOR CAR BUMPERS
Filed March 31, 1952
2 Sheets-Sheet 1
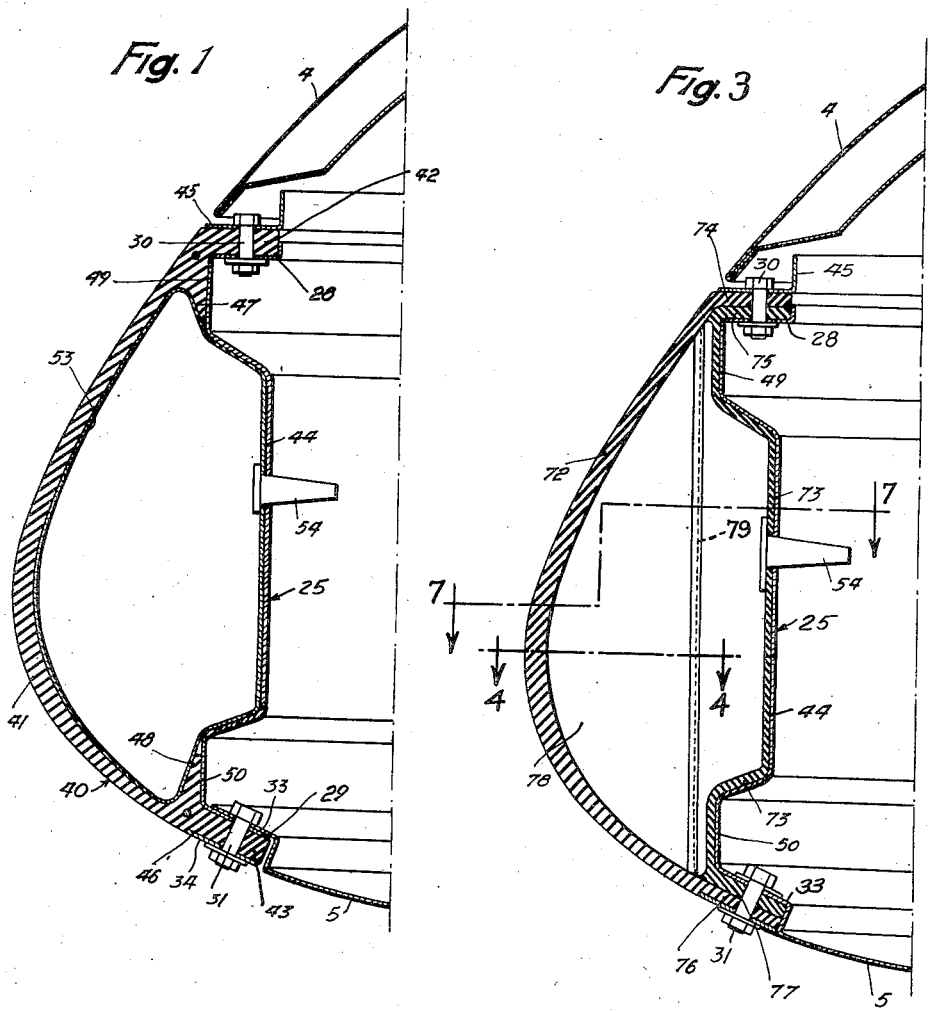
Inventor:
Emile Claveau;
By his attorneys,
Baldwin & Wight

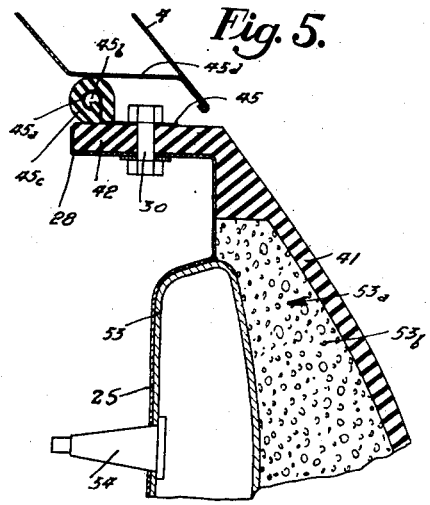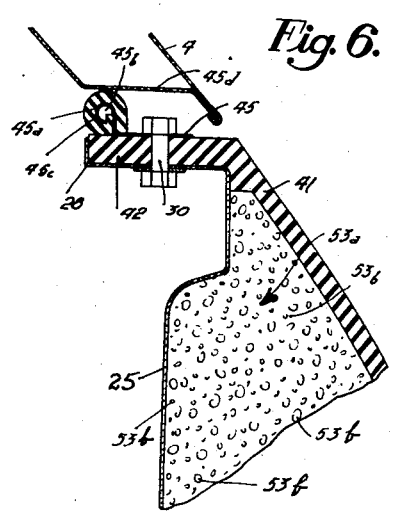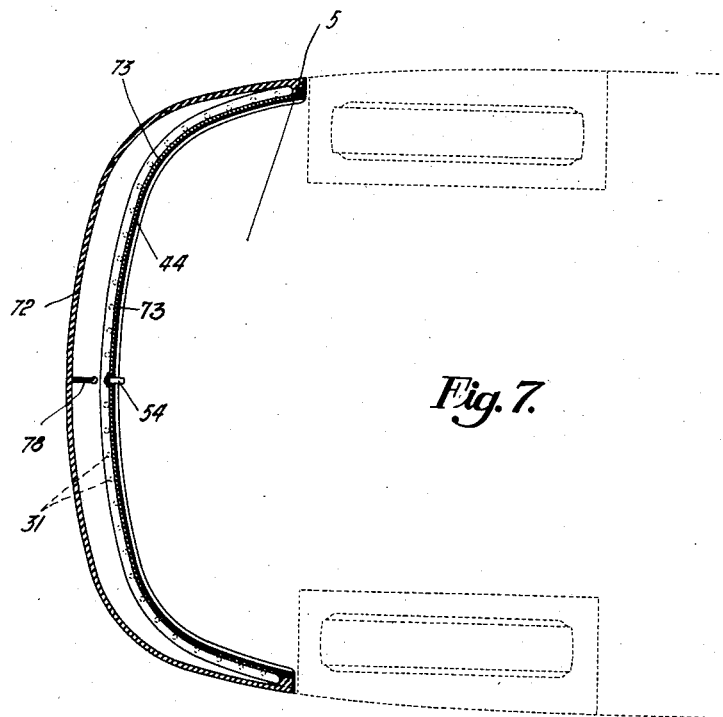

United States Patent Office 2,829,915
Patented Apr. 8, 1958

2,829,915

MOTOR CAR BUMPERS

Emile Claveau, Paris, France

Application March 31, 1952, Serial No. 279,632

Claims priority, application France April 7, 1951

8 Claims. (Cl. 293—71)

Heretofore bumpers for automobile vehicles have always consisted of members added to the cars and to their bodies. These bumpers offer the drawback of a lack of elasticity and consequently they transmit the shocks they receive to the body and structural members of the car, resulting in costly damage.

Although improvements have been made therein, bumpers constitute on present cars, projections or protrusions which are unfavorable to the attainment of perfect streamlined shapes which, in view of present day speeds should offer general shapes very favorable to a good penetration into air.

Finally, the increasing importance given to bumpers, particularly on American cars, causes a considerable increase in their weight resulting in an obvious constructional anomaly since the bumpers finally become more important, heavier and more rigid than the members to which they are secured.

Due to its weight and volume, the conventional bumper thus requires constantly more important fastening means which are generally bolted on members weaker than themselves, which is an absurdity since the bumper and its rigid mass then play the part of a "shock transmitter," a serious drawback which is absolutely unavoidable in the absence of any efficient elastic linking between the bumper, and the carrying elements therefor.

Now, the essential function of the bumper is to absorb shocks so that the latter will not be transmitted to the members it is indispensable to protect.

An object of the present invention is to obviate these various drawbacks. To this effect, it consists in a member possessing an elasticity of its own, imbedded partly in the body of the vehicle, and the outer profile of which continues at each point the profile of the body, without practically any interference with continuity, protrusion or indentation. Such bumpers can be defined as portions of the body, which extend over the portions thereof which should be protected against shocks. Thus these bumpers can extend more or less on the sides of the vehicle.

In accordance with the invention and whatever definition may be given for them, the protecting elements are designed per se and connected with the body or chassis by means of elastic devices capable of absorbing substantial shocks, unless they are sufficiently elastic by themselves to allow of their being mounted directly on the body and directly absorbing the received shocks.

The design of the bumper makes it possible to make them very light without impairing their efficiency and to make them very accessible.

The appended drawings show, by way of example, various embodiments of the bumper which form the subject matter of the invention.

In these drawings:

Fig. 1 is a transverse section through a portion of a vehicle body showing a pneumatic bumper according to the invention;

Fig. 2 is a sectional perspective view of a portion of the bumper;

Fig. 3 is a transverse section similar to Fig. 1, showing a modification of the invention;

Fig. 4 is a transverse fragmentary section on line 4—4 of Fig. 3;

Fig. 5 shows a transverse section of a portion if another bumper according to the invention;

Fig. 6 is a similar view of another bumper construction; and

Fig. 7 is a horizontal section on line 7—7 of Fig. 3, extending throughout the length of the bumper laterally of the vehicle, portions of the latter being shown in dotted lines.

Referring to Fig. 1, the numerals 4 and 5 designate portions of the vehicle body at one end thereof, shown in the present instance as being the rear end of the vehicle, and the numeral 4 designating the lid of the luggage compartment. A rigid structural member 25 extends transversely of the vehicle and defines a rearwardly opening recess, the central portion of the structural member 25 being offset inwardly from the adjacent end of the vehicle as at 44. The upper and lower extremities of the structural member 25 have inwardly offset flanges 28 and 29 for a purpose to be described.

A bumper indicated as a whole by the numeral 40 is adapted to be supported by the end of the vehicle. This bumper comprises an elastic body 41 formed of rubber or other suitable material curved in vertical section, as shown in Fig. 1, to provide a smooth external surface the upper and lower portions of which form relatively smooth continuations of the adjacent vehicle body portions 4 and 5. At its top and bottom edges, the body 41 is provided with inwardly extending flanges 42 and 43, the former of which lies over the flange 28 and the lower of which lies under the flange 29.

Above the flange 42 is arranged a rigid member 45 having a horizontal flange portion seating on the flange 42. The latter flange is clamped between the flange 28 and the horizontal portion of the member 45 by bolts 30, accessible when the lid 4 is lifted.

A bolt 31 secures the lower flange 43 of the bumper body in position. This bolt passes through the flange 29 and through a flange 33 formed on the body portion 5 and offset upwardly to lie over the flange 29 as shown. The bolt 31 also passes through a plate 34 lying beneath the flange 43. Accordingly, it will be apparent that the bolts 30 and 31 rigidly secure the bumper flanges 42 and 43 in position.

Adjacent the upper and lower portions of the structural member 25, the bumper body is provided respectively with a downturned flange 47 and an upturned similar flange 48. The flanges 47 and 48 seat against the adjacent portions 49 and 50 of the structural member 25. The flanges 47 and 48 cooperate with adjacent portions of the structural member 25 to eliminate any sharp angular spaces formed between the member 25 and bumper body 41, and in such space is arranged an inflatable tube 53. This tube carries an inflating valve 54, accessible upon opening the lid 4, for inflating the tube 53 to any desired pressure.

The form of the invention shown in Fig. 3 is quite similar to the form previously described and parts common to these two forms of the invention have been indicated by the same reference numerals. In Fig. 3, an elastic bumper body 72 similar to the body 41 has been shown. Instead of the relatively thick flanges 42 and 43, the bumper body is provided with somewhat thinner flanges 74 and 76. In the form of the invention shown in Fig. 3, the inflatable tube or casing 53 is eliminated and the space between the rigid body 25 and bumper body 72 is directly inflatable. To render such space leakproof, the structural member 25 has an inner layer of rubber or other elastic material 73 overlying it. Such layer of material is provided at its upper end with an inturned flange 75 lying between the flanges 28 and 74, and the flanges 74 and 75 are clamped in leakproof engagement by the bolts 30.

Similarly, a flange 77, forming part of the elastic layer 73, overlies the flange 76 between such flange and the flange 33, and a leakproof joint is formed between the flanges 76 and 77 by means of the bolts 31. Preferably, the flanges 74 and 75 are vulcanized to each other, and the same is true of the flanges 76 and 77. Whereas the flanges 29 and 33 are separate in Fig. 1, the body portion 5 in Fig. 3 has been shown integral with the structural member 25 and accordingly the flange 33 constitutes the only metal flange overlying the rubber flange 77.

If desired, the bumper body 72 may be stiffened by a rib 78 (Figs. 3 and 4), preferably formed of rubberized fabric. The edges of the rib 78 adjacent the structural member 25 may be straight vertically as in Fig. 3, and such edge, if desired, may be stiffened by a wire 79.

A further modified portion of the invention is shown in Fig. 5, in which certain parts are identical with those previously described and have been indicated by the same reference numerals. In Figs. 1 and 3, the stiffening of the bumper body is accomplished wholly or almost entirely by internal air pressure. A somewhat different arrangement is shown in Fig. 5. Instead of employing a pneumatic tube or casing completely filling the space between the structural member 25 and the bumper body 41, a pneumatic tube or casing 53 is provided which is not as extensive vertically as in Fig. 1 and extends only through part of the distance to the bumper body 41. The remainder of such space is filled with a mass of cellular or India rubber material 53a containing a great number of gaseous bubbles 53b, the pressure of which is equal to or higher than atmospheric pressure.

In Fig. 5 the upper flange 45 has a bent portion 45a extending transversely of the vehicle and forming a tubular member 45b arranged in a surrounding sealing member 45c. A flange 45d, forming part of the lid or cover 4, engages the seal 45c to seal against leakage.

A closely similar form of the invention is shown in Fig. 6. This form of the invention is identical with the form shown in Fig. 5, except that the pneumatic tube or casing 53 is eliminated and the mass of resilient material 53a entirely fills the space between the structural member 25 and bumper body 41. The lower ends of the structures in Figs. 5 and 6 may coincide generally with the showing in Fig. 1.

*Operation*

The operation of the bumper structure will be apparent from the foregoing description. In each form, what amounts to a recess in the end of the vehicle body is utilized for the mounting of the bumper structure. Such structure includes an inner rigid support fixed to the vehicle body and an outer elastic bumper unit the outer surface of which forms smooth continuations of the adjacent upper and lower portions of the vehicle body. Thus, the streamlined characteristics of the vehicle body are preserved and the protrusion of rigid bumpers is eliminated. Whereas in present-day constructions the protruding bumpers have become highly rigid and transmit thrusts directly to the frame of the vehicle, thrusts are cushioned with the present device. Obviously, with either form of the invention, the cushioned external structure absorbs thrusts, and minor collisions can occur without any damage whatever to vehicle parts. The cushioning action tends to prevent injury to passengers in the vehicle since solid thrusts are completely eliminated.

While the invention has been illustrated as being mounted relative to the rear end of the vehicle body with the member 4 constituting the movable lid or cover of the luggage compartment, it will be apparent that the invention can equally well be applied to the front end of a vehicle. When the invention is applied to the front end, the member 4 would be any type of movable cover to provide access to the bolts 30 to apply and remove the bumper structure. Obviously, the bolts 31 are directly accessible from their lower ends and are accessible at their upper ends through the space provided by opening the member 4.

If the invention is applied to the rear end of a vehicle, obviously a removable bottom will be used covering the upstanding flange of the member 45 to form a bottom for the luggage compartment. Such means, however, forms no part of the present invention.

In the form of the invention shown in Figs. 5 and 6, the invention operates in the same manner as before, except that whereas the upstanding flange of the member 45 in the previous case will prevent water from entering the space back of such flange, the sealing members 45c in Figs. 5 and 6 act as sealing elements for the same purpose.

From Fig. 7 it will be apparent that the bumper extends from side to side of the vehicle body with the ends of the bumper forming substantial continuations of the sides of such body. It also will be apparent from Fig. 7 that the bolts 31, shown in detail in Fig. 3, are substantial duplicates of the bolts 30 utilized for securing the bumper to one end of the vehicle body, and from Fig. 7 it will be apparent that such bolts are used at spaced intervals throughout the width of the vehicle.

What I claim is:

1. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body and fixed to said rigid member, and means for elastically maintaining said bumper body and said rigid member spaced from each other substantially throughout their heights.

2. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body and fixed to said rigid member, means forming in cooperation with said bumper body and said rigid member an airtight space, and means for inflating said space.

3. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body and fixed to rigid member, and means comprising a leakproof layer of material covering said rigid member outwardly thereof longitudinally of the vehicle body and sealed at its extremities relative to said bumper body to form with the latter an airtight space, and means for inflating such space.

4. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body and fixed to rigid member, there being a space between such rigid member and said bumper body, and means comprising a mass of resilient cellular material in said space.

5. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body and fixed to said rigid member, there being a space between such rigid member and said bumper body, an inflatable casing filling part of said space and seating against such rigid member, and a mass of resilient cellular material filling the remainder of said space.

6. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body, a plate overlying said top flange, bolts passing through said top flange and through said plate and said rigid member to fix them together, said plate having an upwardly extending portion, a sealing member carried by said upwardly extending portion and engaging against said top vehicle portion, and means for elastically maintaining said bumper body and said rigid member spaced from each other.

7. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body, a plate overlying said top flange, bolts passing through said top flange and through said plate and said rigid member to fix them together, said plate having an upwardly extending portion, a sealing member carried by said upwardly extending portion and engaging against said top vehicle portion, there being a space between said rigid member and said bumper body, and a mass of resilient cellular material filling said space.

8. In combination with an end portion of a vehicle body having spaced top and bottom portions, a rigid member extending transversely of the vehicle and having at least a portion thereof horizontally offset inwardly from such end of the vehicle, a bumper structure comprising a resilient bumper body having an outer face curved from top to bottom and having its upper and lower portions in vertical section forming substantial continuations of the adjacent portions of the vehicle body, said bumper body having top and bottom flanges directed inwardly longitudinally of the vehicle body, a plate overlying said top flange, bolts passing through said top flange and through said plate and said rigid member to fix them together, said plate having an upwardly extending portion, a sealing member carried by said upwardly extending portion and engaging against said top vehicle portion, and means elastically maintaining said bumper body and said rigid member spaced from each other, such means comprising an inflatable casing seated against said rigid member and a mass of elastic cellular material between said inflatable casing and said bumper body.

References Cited in the file of this patent

UNITED STATES PATENTS

| D. 152,320 | Buehrig | Jan. 11, 1949 |
| 1,727,070 | Kruckenberg et al. | Sept. 3, 1929 |
| 1,754,112 | Lusse | Apr. 8, 1930 |
| 1,858,743 | Langstreth | May 17, 1932 |
| 2,054,838 | Short | Sept. 22, 1936 |
| 2,062,313 | Jandus | Dec. 1, 1936 |
| 2,161,837 | Tell | June 13, 1939 |
| 2,186,505 | Tibbetts | Jan. 9, 1940 |
| 2,188,082 | Imhofe | Jan. 23, 1940 |
| 2,245,746 | Bang | June 17, 1941 |
| 2,420,894 | Mee | May 20, 1947 |
| 2,427,160 | Reynolds | Sept. 9, 1947 |
| 2,578,068 | Johnson | Dec. 11, 1951 |
| 2,612,964 | Hobbs | Oct. 7, 1952 |
| 2,648,090 | Howard | Aug. 11, 1953 |
| 2,708,594 | MacPherson | May 17, 1955 |

FOREIGN PATENTS

| 627,022 | France | Sept. 24, 1927 |